[11] 3,598,466

[72] Inventor Wolfgang Friedl
 Neckargemund, Germany
[21] Appl. No. 36,096
[22] Filed May 11, 1970
[45] Patented Aug. 10, 1971
[73] Assignee Eltro GmbH & Co.
 Heidelberg, Germany
[32] Priority May 10, 1969
[33] Germany
[31] P 19 23 932.8

[54] HOLOGRAPHIC CORRECTION PROCESS FOR OPTICAL SYSTEM ABERRATIONS
10 Claims, 1 Drawing Fig.
[52] U.S. Cl.......................................... 350/3.5,
 250/1
[51] Int. Cl.................................................. G02b 27/22
[50] Field of Search............................................ 350/3.5

[56] References Cited
OTHER REFERENCES
El-Sum, Science & Technology, p. 55 (11/1967)[350/3.5]

*Primary Examiner*—David Schonberg
*Assistant Examiner*—Robert L. Sherman
*Attorney*—Waters, Roditi, Schwartz & Nissen ABSTRACT: A hologram is produced by a corrective optical system operative in the visible radiation band, and the hologram is incorporated in an infrared optical image-reproducing system to correct aberrations of the infrared optical system. The visible radiation optical system is constructed to have aberrations identical to those of the infrared optical image system and the hologram is combined with the infrared optical system after magnification of the hologram on a linear scale of reproduction by the ratio of the IR wavelength to the wavelength in the visible band.

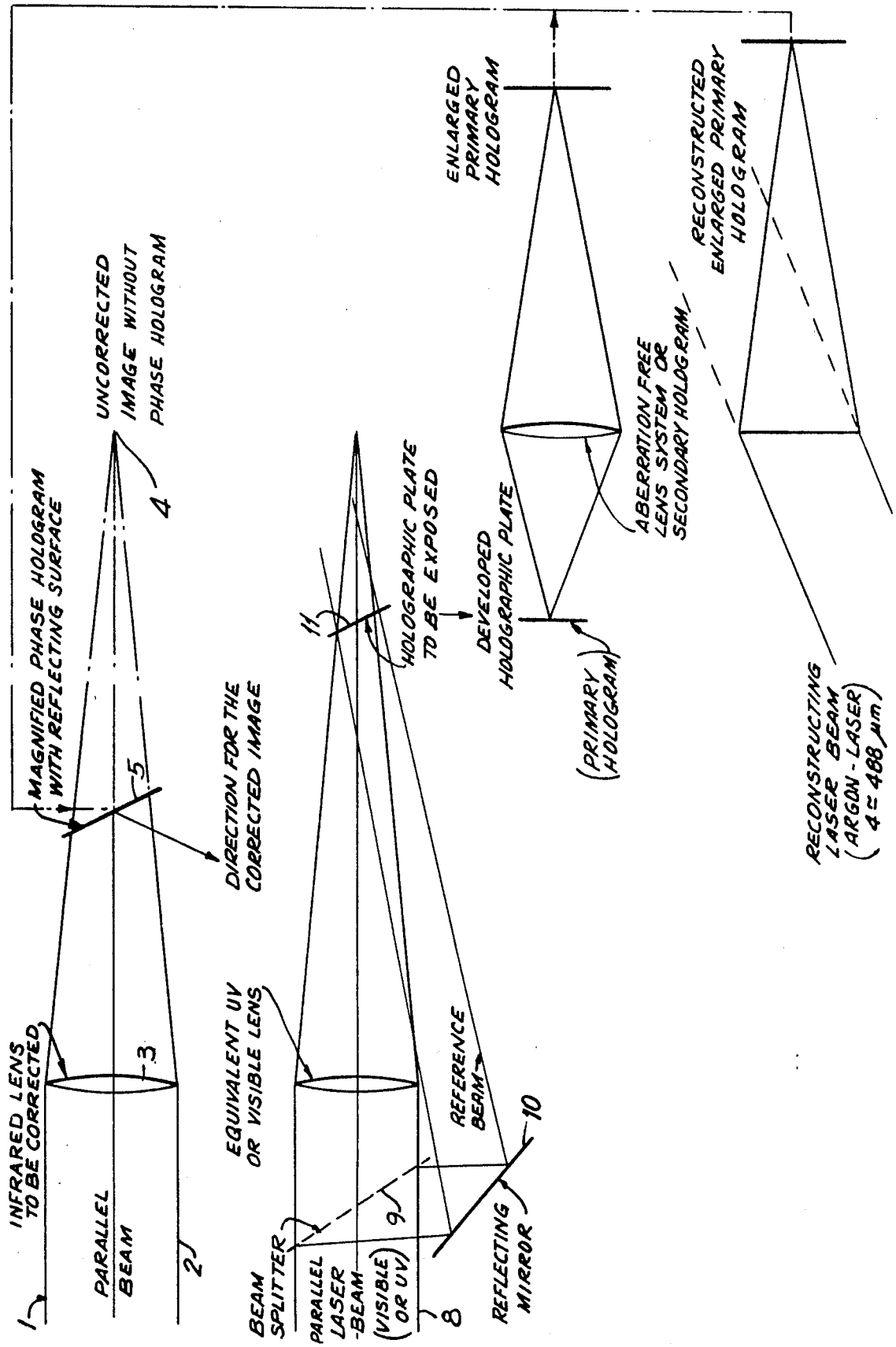

HOLOGRAPHIC CORRECTION PROCESS FOR OPTICAL SYSTEM ABERRATIONS

DESCRIPTION OF THE INVENTION

This invention relates to a process for the holographic correction of aberrations in an optical system by production of a hologram and by combining the hologram with the optical system.

One holographic process for the correction of picture distortion is already known (German Pat. No. 1,472,071). The essence of that process is to put an optical system to be corrected, especially a single lens in place of the transparent object to be holographed (as was hitherto the usual practice) and then to use the hologram with that optical system so as to produce a corrected image of an object.

In practice, however, the known process can be used only in the visible and ultraviolet bands of the spectrum. This limitation of the spectral scope of usage is due to the fact that only with the aid of visible and ultraviolet sensitive materials has it been possible until now to produce holograms possessing the requisite quality for the correction of picture distortion.

The basic object of the present invention is to provide correction of picture distortion in the infrared band of the spectrum also.

Starting with a process for holographic correction of optical system aberrations conforming to the above classification, a hologram with visible or ultraviolet radiation for the correction of an infrared optical image-reproducing system is made according to this invention, using for this purpose an optical system having aberrations identical with those of the infrared optical system to be corrected, and then the hologram after enlargement on a linear scale of reproduction in the ratio IR wavelength/ wavelength in visible band is combined with the infrared optical system.

BRIEF DESCRIPTION OF THE DRAWINGS

The sole FIG. of the drawing is a diagrammatic representation of the process according to the invention.

In the process according to the invention, therefore, first a visible radiation reproduction system is sought, preferably a simple lens which for a wavelength in the visible band of the spectrum, for example the wavelength $\lambda_s = 0.6328$ $\mu$m., will produce the same aberrations as the reproduction system to be corrected for infrared radiation at the wavelength under consideration in the infrared band. Here too a simple lens is preferably employed.

In order to find this correlation between the visible radiation reproduction system and the one for infrared radiation, fulfilling this condition of identical aberrations, one can start either with the fact that the geometric-optical aberrations for like material refractive indices and like geometric dimensions are equal irrespective of wavelength, or in the case of different refractive indices of the two optical materials, calculate the geometric data of the lenses which furnish equal aberrations of the two corresponding systems for the specified geometric data.

In the first case, that is to say, where the distinguishing feature is, for example, a lens for wavelength $\lambda_s = 0.6328$ $\mu$m. having the same refractive index as a lens made of an optical infrared material for a predetermined wavelength $\lambda_{IR}$ in the infrared range can, of course, be dealt with more simply than the more common case where the geometric details of a lens have to be calculated, for instance, on the basis of two refractive index values.

The former is also so much more advantageous because it basically allows aberrations of any chosen order to be corrected. Of course, only in specific cases is it possible to find materials which fulfill the condition of identical refractive index values.

The more common case, on the other hand, is limited in practice to the correction of image distortions of the fifth order, if tedious calculations are to be avoided.

On the basis of the fifth order theory of aberration, the determination of an ordinary lens equivalent in aberration to a prescribed infrared lens is made as follows:

The infrared lens is specified by the following parameters:
Radius of curvature of the primary surface—$r_1$
Radius of curvature of the secondary surface—$r_2$
Thickness at center—$d$
Refractive index of the optical medium—$n(\lambda_{IR})$ The corresponding values of an associated (thin section) equivalent lens can be derived from the numerical values of those parameters, it being here expedient to work on a standard basis of taking all geometric dimensions in units of focal lengths, that is to say, standardizing on the refractive power of 1 (unity). The calculated numerical values for the aberration-equivalent lens, other things being equal, then need only be changed by the constant of variation by which the refraction index of an infrared lens directly under consideration differs from unit, if the aberrational equivalency of the two lenses is to be maintained.

For simplification, the following explanations are based on the third order or Seidel aberrations formulas. These formulas are functions of the following auxiliary quantities:

$A = (n+2)/n$
$B = n/(n-1)$
$C = (n+1)/n$
$\mu = (1/r_1 + 1/r_2) - \gamma$ and the refractive power
$\gamma = (n-1) \cdot (1/r_1 - 1/r_2)$ assuming "thin-section" equivalent lenses and that the object-lens intercept length goes to infinity, which is the approximate situation in most practically important cases. In detail then, we have:

For spherical aberration $\alpha = \gamma(A\mu^2 - 2\gamma\mu + B^2\gamma^2)$,

For coma $\beta = \gamma(\gamma - C\mu)$, and

For Petzval curvature $P = \gamma/n$.

In this connection there is the further assumption that the lenses are on each occasion in air and the refractive index of the air in the spectral regions under consideration is approximately equal to unity independently of wavelength, which has to be taken especially into consideration in definite infrared spectral regions. Introducing the radius of curvature ratio $r_1/r_2$ of the lens under consideration, it is evident that the geometrical optic aberration in terms of the Seidel aberration theory depends, apart from this, only on the refractive power and index of refraction of the lens material.

Other conditions being equal, spherical aberration increases according to the cube of the refractive power, coma with the square and Petzval curvature with the power itself in the first degree. For these three kinds of aberration, three equations in all can be worked out, allowing the two radii of curvature $r_1'$ and $r_2'$ of aberrationally equivalent glass lenses to be calculated for refractive power $\gamma$, of the index of refraction of the lens material $n(\lambda_s)$ is determined before hand by selection of a definite kind of glass and a definite wavelength $\lambda_s$. The quotient $r_1'/r_2'$ of the equivalent glass lens is then also established by the radii of curvature $r_1'$ and $r_2'$.

Various possibilities are available for the fashioning of the aberrationally equivalent simple lens.

It can be given the same refractive power as that of the infrared lens to be corrected; in this case the hologram produced with the equivalent simple lens for the correction of the infrared lens must be linearly magnified by $\lambda_{IR}/\lambda_s$.

If a simple lens is determined, having the same geometrical optic aberrations as the infrared lens with the same refractive power, one can proceed with the correction of the infrared lens also in such a way that a hologram is produced with an otherwise analogous glass lens of another refractive power. The refractive power of such simple lens must then be selected so that the angular variation of the rays occasioned by the relevant aberrations of the infrared lens are directly offset by the hologram. The diffraction angles occasioned by the hologram are, in this case, equal in total magnitude to the angular variations caused by the infrared lens. The need for magnification of the hologram is avoided in this way.

The associated aperture ratios can also be correspondingly selected when the two lenses have the same refractive powers.

If a practical solution is found for the equivalent conditions, a hologram produced with such a lens can be used immediately for the correction of the infrared lens.

Two further embodiments of the object of this invention are described below:

For the correction of monochromatic geometrical optical aberrations of any particular order, that is therefore of even higher order than the third, one can proceed without any calculation to choose for the infrared lens a material whose index of refraction n for wavelength $\lambda_{IR}$ is equal to the index of refraction $n'$ of a glass for wavelength $\lambda_s$ ($\lambda_s = 0.6328$ $\mu$m., for example) down to the slightest possible deviations. If the refractive indices of the two lenses are equal to one another, then the monochromatic geometrical optical aberrations will be equal if in addition the lenses have equal geometric values ($r_1$, $r_2$, $d$), since the geometrically optical reproductional properties depend solely on these and on the ratio of the refractive indices $n/n_{air}$. There is here, therefore, the tacit assumption that the refractive index in air for both wavelengths is the same, which is approximately true for spectral regions in which the air is thoroughly free from absorption, but this must moreover be carefully observed.

The following media, for example, are suitable for this process:

| | |
|---|---|
| Magnesium oxide (MgO) | $n=1.69$ for $\lambda_{IR}=3\mu$m. |
| Aluminum oxide (Al$_2$O$_3$) | $n=1.70$ for $\lambda_{IR}=3\mu$m. |
| Spinel (MgO Al$_2$O$_3$=MgAl$_2$O$_4$) | $n=1.72$ for $\lambda_{IR}=3\mu$m. |
| Calcium Fluoride (CaF$_2$) | $n=1.42$ for $\lambda_{IR}=3\mu$m., and |
| Barium Fluoride (BaF$_2$) | $n=1.46$ for $\lambda_{IR}=3\mu$m. |

Types of glass which, for example, have these refractive indices for $\lambda_s = 0.6328$ $\mu$m., can be found in the relevant literature.

The hologram which is produced according to the method of the invention is a photographic hologram and this may be converted to a phase hologram. Moreover, the photographic hologram may be impressed directly onto the surface of a lens in the infrared system.

In the drawing is seen an infrared optical system 1 wherein a parallel visible beam 2 passes through an infrared lens to be corrected to normally produce an uncorrected image 4. According to the invention, however, a magnified phase hologram 5 with a reflecting surface is placed after the lens 3 to produce a corrected image.

The phase hologram is produced by a system 6 comprising an equivalent ultra violet or visible lens 7 with aberrations identical with those of the infrared system 1, the lens 7 being produced as previously described.

To produce the phase hologram, a parallel laser beam 8 strikes a beam splitter 9 and a portion of the beam passes through the equivalent lens 7 while another portion is reflected from a mirror to produce a reference beam which is combined with the beam passing through lens 7 to expose a holographic plate 11 which is developed and enlarged and converted to a phase hologram in known manner to produce the magnified phase hologram 5.

What I claim is:

1. A process for the holographic correction of aberrations in an optical system by production of a hologram and by combining the hologram with the optical system, the process comprising first constructing an optical system in the visible band with aberrations identical with those of an infrared optical system to be corrected, making a hologram with visible radiation for the correction of the infrared optical system and combining the hologram with the infrared optical system after magnification of the hologram on a linear scale of reproduction in the ratio IR wavelength/wavelength in visible band.

2. A process according to claim 1 comprising selecting optical glass for the optical system for the production of the hologram with the same refractive index for a wavelength in the visible range as the optically infrared material for the wavelength to be corrected in the infrared range, so that the optical system in glass with the same geometrid data also produces the same aberrations as the infrared system.

3. A process according to claim 1, wherein the geometric characteristics for the hologram producing system for a wavelength in the visible band produces, at that wavelength, the same aberrations as does the system to be hologram-corrected for the selected wavelength in the infrared band, said geometric characteristics satisfying the Aberration formulas of the fifth order when refractive indices are prespecified for a wavelength in the infrared and visible bands respectively.

4. A process according to claim 1, wherein the hologram is produced by the use of photographic materials.

5. A process according to claim 1, wherein the magnification of the hologramic is also produced by a holograph process.

6. A process according to claim 1, wherein the magnification of the hologram is produced by geometrical optical reproduction by a corrected system of large aperture ratio.

7. A process according to claim 1, wherein the optical system consists of only one lens.

8. A process according to claim 1, wherein the hologram is photographic and is converted into a phase hologram for employment in the infrared system.

9. A process according to claim 8, wherein the phase hologram is given a reflecting surface by metallic vapor deposition, thus additionally facilitating a change of direction of the optical axis in the ray configuration.

10. A process according to claim 1, wherein the hologram is impressed onto a surface of a lens.